US011383557B2

United States Patent
(12) United States Patent
Shibamoto

(10) Patent No.: US 11,383,557 B2
(45) Date of Patent: Jul. 12, 2022

(54) TIRE FOR TWO-WHEELED AUTOMOTIVE VEHICLE

(71) Applicant: SUMITOMO RUBBER INDUSTRIES LTD., Kobe (JP)

(72) Inventor: Shohei Shibamoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 409 days.

(21) Appl. No.: 15/870,518

(22) Filed: Jan. 12, 2018

(65) Prior Publication Data

US 2018/0312007 A1 Nov. 1, 2018

(30) Foreign Application Priority Data

May 1, 2017 (JP) ............................ JP2017-090928

(51) Int. Cl.

*B60C 9/22* (2006.01)
*B60C 11/00* (2006.01)
*B60C 9/20* (2006.01)

(52) U.S. Cl.

CPC ........ *B60C 11/0058* (2013.01); *B60C 9/2009* (2013.01); *B60C 9/2204* (2013.01); *B60C 11/005* (2013.01); *B60C 2009/2022* (2013.01); *B60C 2009/2041* (2013.01); *B60C 2009/2087* (2013.01); *B60C 2011/0025* (2013.01); *B60C 2200/10* (2013.01)

(58) Field of Classification Search

CPC ..... B60C 2009/2022; B60C 2011/0025; B60C 2009/2087; B60C 19/00; B60C 9/22; B60C 2200/10

See application file for complete search history.

(56) References Cited

U.S. PATENT DOCUMENTS

2008/0035263 A1* 2/2008 Nakamura ............ B60C 9/2204 152/537
2008/0314485 A1* 12/2008 Hirano .................. B60C 9/0007 152/209.11
2010/0212799 A1* 8/2010 Kasai ...................... B60C 11/00 152/454

(Continued)

FOREIGN PATENT DOCUMENTS

DE 3525394 A1 * 1/1986 ............. B60C 11/00
EP 1769943 A1 4/2007

(Continued)

*Primary Examiner* — Alison L Hindenlang
*Assistant Examiner* — Debjani Roy
(74) *Attorney, Agent, or Firm* — Birch, Stewart, Kolasch & Birch, LLP

(57) ABSTRACT

A tire 2 includes: a tread 4 forming a tread surface 20; a band 14 disposed inward of the tread 4 in a radial direction; and a belt 12 disposed between the tread 4 and the band 14 in the radial direction. The tread 4 includes a center region 22 disposed at a center in an axial direction, and a shoulder region 24 disposed on an outer side in the axial direction. The band 14 includes a band cord. The band cord is helically wound and extends in a circumferential direction. The belt 12 includes a belt cord. The belt cord extends so as to be tilted relative to an equator plane. An absolute value of an angle of the belt cord relative to the equator plane is not less than 70° and not greater than 90°.

6 Claims, 1 Drawing Sheet

(56) References Cited

U.S. PATENT DOCUMENTS

2011/0303339 A1* 12/2011 Valle .......................... B60C 9/08
152/548
2014/0202605 A1* 7/2014 Saiwaki ................ B60C 11/005
152/209.5
2015/0122393 A1 5/2015 Kubo
2018/0056721 A1* 3/2018 Tochiki ..................... B60C 9/08

FOREIGN PATENT DOCUMENTS

EP 1967390 A1 9/2008
EP 2050587 A1 4/2009
JP 2007-168531 A 7/2007
JP 2014-148281 A 8/2014

* cited by examiner

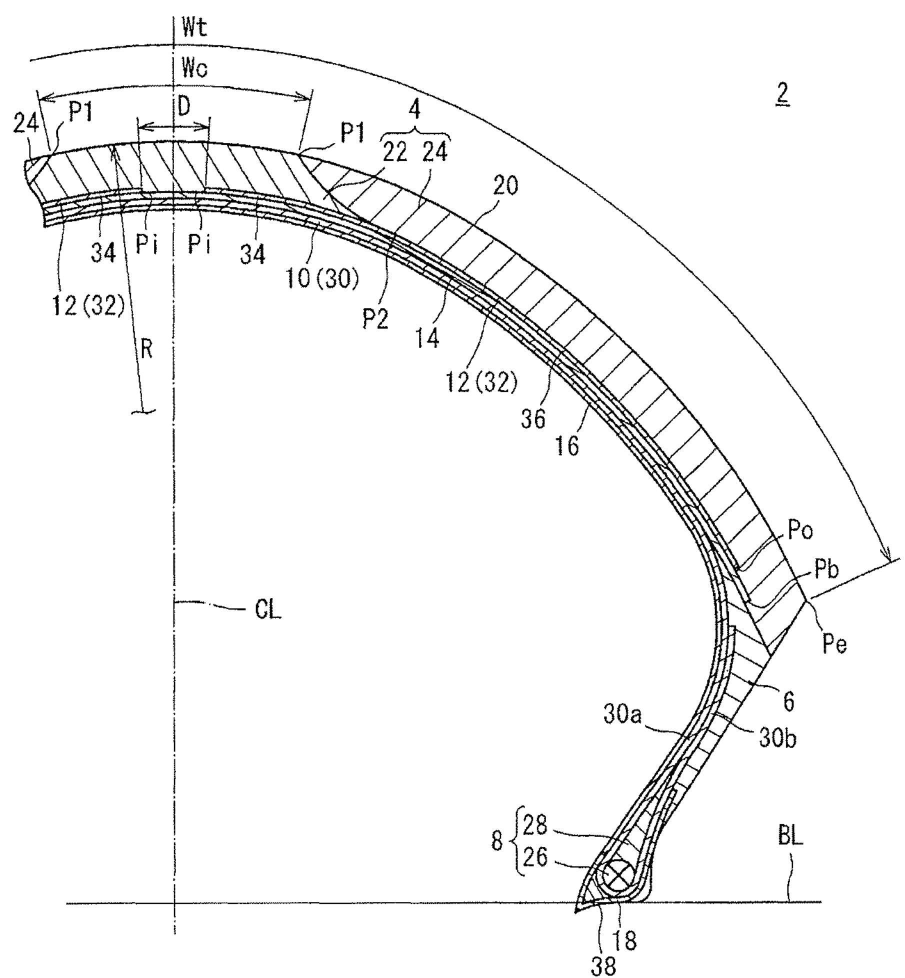
Wt
Wc
D
2
24
P1
P1
4
22 24
20
34
Pi
Pi
34
10(30)
12(32)
P2
14
R
12(32)
36
16
Po
Pb
Pe
CL
6
30a
30b
8
28
26
BL
18
38

TIRE FOR TWO-WHEELED AUTOMOTIVE VEHICLE

This application claims priority on Patent Application No. 2017-090928 filed in JAPAN on May 1, 2017. The entire contents of this Japanese Patent Application are hereby incorporated by reference.

BACKGROUND OF THE INVENTION

Field of the Invention

The present invention relates to pneumatic tires to be mounted to two-wheeled automotive vehicles.

Description of the Related Art

In cornering of a two-wheeled automotive vehicle, a vehicle body is tilted inward. In order to facilitate the cornering, a curvature radius of a tread surface of a tire in a two-wheeled automotive vehicle, is less than in a four-wheeled automotive vehicle. In straight running of a two-wheeled automotive vehicle, a center region of a tread of a tire contacts with the ground. In cornering of the two-wheeled automotive vehicle, a shoulder region of the tread of the tire contacts with the ground. In view of improvement of running performance, various tires which use rubbers that suitably act in the center region and the shoulder region, respectively, of the tread are suggested. Examples of such a tire are disclosed in JP2014-148281 and JP2007-168531.

A two-wheeled automotive vehicle that runs at a high speed is rapidly accelerated when the vehicle shifts from cornering to straight running. In such a rapid acceleration, a tire in a rear wheel is under a heavy load. The tire may slide laterally due to the heavy load. Acceleration is reduced due to the sliding. It is considered that rubber that exhibits an excellent grip performance is used in the shoulder region which contacts with the ground during cornering in order to inhibit the sliding.

As described above, in a tire for a two-wheeled automotive vehicle, a curvature radius of a tread surface is small. In the tread surface, a circumferential length on a side closer to the equator plane and a circumferential length on a side closer to the tread end are greatly different from each other. In the cornering, a portion, of the tread surface, on the side closer to the equator plane and a portion, of the tread surface, on the side closer to the tread end contact with a road surface. In the tire, slipping occurs due to the difference in circumferential length between the side closer to the equator plane and the side closer to the tread end. The slipping may cause a so-called abrasion (a state where the surface is rubbed and wavily worn). The occurrence of the abrasion causes degradation of grip performance.

In particular, in a tire having a band cord that extends in the circumferential direction, stiffness in the direction perpendicular to the circumferential direction is low. In the tire, a ground contact width, in the lateral direction, of the tread surface is likely to be increased in cornering. By the band cord being provided, the tire allows high speed running performance to be improved while abrasion is likely to occur in the tire. In the tire, it is not easy to improve grip performance while inhibiting occurrence of abrasion.

An object of the present invention is to provide a tire, for a two-wheeled automotive vehicle, which allows grip performance in cornering to be improved while inhibiting occurrence of abrasion.

SUMMARY OF THE INVENTION

A tire, for a two-wheeled automotive vehicle, according to the present invention includes: a tread forming a tread surface; a band disposed inward of the tread in a radial direction; and a belt disposed between the tread and the band in the radial direction. The tread includes a center region disposed at a center in an axial direction, and a shoulder region disposed on an outer side in the axial direction. The band includes a band cord. The band cord is helically wound and extends in a circumferential direction. The belt includes a belt cord. The belt cord extends so as to be tilted relative to an equator plane. An absolute value of an angle of the belt cord relative to the equator plane is not less than 70° and not greater than 90°.

Preferably, a ratio (Wc/Wt) of a width Wc of the center region to a width Wt of the tread is not less than 0.05 and not greater than 0.20.

Preferably, the belt includes a pair of belt layers spaced from each other over a distance D in the axial direction. One of the belt layers is disposed on one of sides lateral to the equator plane in the axial direction, and the other of the belt layers is disposed on the other of the sides lateral to the equator plane in the axial direction.

Preferably, the distance D is less than the width Wc of the center region.

Preferably, a density Ec of the belt cord in the center region is less than a density Es of the belt cord in the shoulder region.

Preferably, a density difference (Es−Ec) between the density Ec and the density Es is not less than 2 (belt cords/5 cm) and not greater than 10 (belt cords/5 cm).

Preferably, a complex elastic modulus Ec* of the center region is less than a complex elastic modulus Es* of the shoulder region.

Preferably, a difference (Es*−Ec*) between the complex elastic modulus Ec* and the complex elastic modulus Es* is not less than 0.5 MPa and not greater than 1.5 MPa. In the tire according to the present invention, the belt inhibits the tread from being deformed in the direction perpendicular to the circumferential direction. The belt inhibits deformation of the tread when a heavy load is applied due to rapid acceleration in cornering. In the tread, the ground contact width of the tread surface is reduced in the direction orthogonal to the circumferential direction. In the tire, occurrence of abrasion is inhibited. Since occurrence of abrasion is inhibited, rubber that exhibits grip performance that is more excellent than that of conventional rubber can be used for the tire. The tire allows grip performance in cornering to be improved while inhibiting occurrence of abrasion.

BRIEF DESCRIPTION OF THE DRAWINGS

The FIGURE is a cross-section view of a part of a pneumatic tire according to one embodiment of the present invention.

DESCRIPTION OF THE PREFERRED EMBODIMENTS

The following will describe in detail the present invention based on preferred embodiments with reference where appropriate to the accompanying drawing.

The FIGURE shows a pneumatic tire 2. In The FIGURE, the up-down direction represents the radial direction of the tire 2, the left-right direction represents the axial direction of the tire 2, and the direction perpendicular to the surface of the drawing sheet represents the circumferential direction of the tire 2. An alternate long and short dash line CL represents an equator plane of the tire 2. The shape of the tire 2 is symmetric about the equator plane except for a tread pattern. A solid line BL represents a bead base line. The bead base line is a line that defines a rim diameter (see JATMA) of a normal rim on which the tire 2 is mounted. The bead base line extends in the axial direction.

The tire 2 includes a tread 4, a pair of sidewalls 6, a pair of beads 8, a carcass 10, a belt 12, a band 14, an inner liner 16, and a pair of chafers 18. The tire 2 is of a tubeless type. The tire 2 is mounted to a rear wheel of a two-wheeled automotive vehicle.

The tread 4 has a shape projecting outward in the radial direction. The tread 4 forms a tread surface 20 that comes into contact with a road surface. The tread surface 20 extends from one of tread ends Pe to the other of the tread ends Pe, which is not shown, in the axial direction. The tread 4 includes a center region 22 and a pair of shoulder regions 24. The center region 22 is disposed at the center across the equator plane in the axial direction. Each shoulder region 24 is disposed outward of the center region 22 in the axial direction. The center region 22 and the shoulder region 24 are formed from a crosslinked rubber having excellent wear resistance, heat resistance, and grip performance. In the tire 2, a complex elastic modulus Ec* of the center region 22 is less than a complex elastic modulus Es* of the shoulder region 24.

The tread 4 may have grooves formed therein. A tread pattern is formed by the grooves. The tread 4 may include a base layer, which is not shown. The base layer is disposed inward of the center region 22 and the pair of shoulder regions 24 in the radial direction. The base layer extends from the outer end of one of the shoulder regions 24 to the outer end of the other of the shoulder regions 24 in the axial direction. The base layer is formed from a crosslinked rubber having an excellent adhesiveness.

Each sidewall 6 extends almost inward from the end of the tread 4 in the radial direction. The outer end, of the sidewall 6, in the radial direction is jointed to the tread 4. The sidewall 6 is formed from a crosslinked rubber having excellent cut resistance and weather resistance. The sidewall 6 prevents damage to the carcass 10.

Each bead 8 is disposed inward of the sidewall 6 in the radial direction. The bead 8 includes a core 26, and an apex 28 that extends outward from the core 26 in the radial direction. The core 26 is ring-shaped, and includes a wound non-stretchable wire. A typical material of the wire is steel. The apex 28 is tapered outward in the radial direction. The apex 28 is formed from a highly hard crosslinked rubber.

The carcass 10 includes a carcass ply 30. The carcass ply 30 is extended on and between the beads 8 on both sides, along the tread 4 and the sidewalls 6. The carcass ply 30 is turned up around the core 26 from the inner side toward the outer side in the axial direction. By the carcass ply 30 being turned up, the carcass ply 30 includes a main portion **30*a* and turned-up portions 30*b***.

The carcass ply 30 includes multiple carcass cords aligned with each other, and topping rubber. An absolute value of an angle of each carcass cord relative to the equator plane is from 75° to 90°. In other words, the carcass 10 forms a radial structure. The carcass cord is formed from an organic fiber. Preferable examples of the organic fiber include polyester fibers, nylon fibers, rayon fibers, polyethylene naphthalate fibers, and aramid fibers. The carcass 10 may include two or more carcass plies.

The belt 12 includes a pair of belt layers 32. Each of the belt layers 32 is layered inward of the tread 4 in the radial direction. The belt layer 32 is layered outward of the band 14 in the radial direction. The belt layer 32 is disposed between the tread 4 and the band 14 in the radial direction. In the axial direction, one of the belt layers 32 is disposed on one of sides lateral to the equator plane in the axial direction. The belt layer 32 extends along the tread 4 from an axially inner end Pi to an axially outer end Po. In the axial direction, the other of the belt layers 32 is disposed on the other of the sides lateral to the equator plane in the axial direction. The belt layer 32 extends along the tread 4 from an axially inner end Pi to an axially outer end Po.

Each of the paired belt layers 32 includes multiple belt cords aligned with each other, and topping rubber, which is not shown. Each belt cord is tilted relative to the equator plane. A preferable material of the belt cord is an organic fiber. Preferable examples of the organic fiber include nylon fibers, polyester fibers, rayon fibers, polyethylene naphthalate fibers, and aramid fibers.

Each belt layer 32 includes a center portion 34 that is layered on the center region 22 and a side portion 36 that is layered on the shoulder region 24. A density Ec of the belt cords in the center portion 34 is less than a density Es of the belt cords in the side portion 40. The densities Ec and Es are each obtained as ends that represent the number of the belt cords per a width of 5 cm, in the axial direction, of the belt 12.

The band 14 is disposed outward of the carcass 10 in the radial direction. The band 14 is disposed inward of the tread 4 in the radial direction. The band 14 extends along the tread 4 from one of outer ends Pb to the other of the outer ends Pb in the axial direction. Both the band 14 and the belt 12 reinforce the carcass 10.

The band 14 includes a band cord and topping rubber, which are not shown. The band cord is helically wound from the one of the ends Pb to the other of the ends Pb in the axial direction. The cord extends substantially in the circumferential direction. A tilt angle of the band cord relative to the circumferential direction is not greater than 5° and more preferably not greater than 2°. The band cord is formed from an organic fiber. Preferable examples of the organic fiber include nylon fibers, polyester fibers, rayon fibers, polyethylene naphthalate fibers, and aramid fibers.

The inner liner 16 is disposed inward of the carcass 10. Near the equator plane CL, the inner liner 16 is joined to the inner surface of the carcass 10. The inner liner 16 is formed from a crosslinked rubber having excellent airtightness. A typical base rubber of the inner liner 16 is an isobutylene-isoprene-rubber or halogenated isobutylene-isoprene-rubber. The inner liner 16 maintains the internal pressure of the tire 2.

Each chafer 18 is disposed near the bead 8. When the tire 2 is mounted on a not-illustrated rim, the chafer 18 contacts with the rim. By the contact, a portion near the bead 8 is protected. The chafer 18 includes a seat surface 38 that comes into contact with a rim seat. The chafer 18 is formed from, for example, a fabric and a rubber impregnated into the fabric.

In The FIGURE, reference character P1 represents a boundary between the center region 22 and the shoulder region 24 on the tread surface 20. Reference character P2 represents a boundary between the center region 22 and the shoulder region 24 on the inner circumferential surface. The boundary extends from the radially inner side toward the radially outer side so as to be tilted from the axially outer side toward the axially inner side. The thickness of the center region 22 is gradually reduced from the point P1 toward the point P2. The thickness of the shoulder region 24 is gradually reduced from the point P2 toward the point P1.

In The FIGURE, a single-headed arrow Wt represents a tread width. The tread width Wt represents a width from one of the tread ends Pe to the other of the tread ends Pe, which is not shown. A double-headed arrow Wc represents the width of the center region 22. The width Wc represents a distance from one of the boundaries P1 to the other of the boundaries P1. The tread width Wt and the width Wc are measured along the tread surface 20. A double-headed arrow D represents a distance between the paired belt layers 32. The distance D is a distance from one of the inner ends Pi to the other of the inner ends Pi. The distance D is measured along the outer circumferential surface of the band 14 over which the pair of belt layers 32 are layered. A portion, of the belt layer 32, from the inner end Pi to the boundary P2 is the center portion 34, and a portion, of the belt layer 32, from the boundary P2 to the outer end Po is the side portion 36.

A single-headed arrow R represents a curvature radius of the tread surface 20 at the equator plane. The curvature radius R of the tire 2 mounted to a two-wheeled automotive vehicle is less than a curvature radius of a tire mounted to a four-wheeled automotive vehicle. Thus, a rider is allowed to easily tilt the two-wheeled automotive vehicle inward in cornering. By this tilting, cornering of the two-wheeled automotive vehicle is facilitated. The curvature radius R is typically not less than 50 mm and not greater than 150 mm.

The tire 2 is mounted to a rear wheel of a two-wheeled automotive vehicle. In the tire 2, the band 14 has the band cord that extends in the circumferential direction. The tire 2 includes the band 14, whereby radial growth is inhibited in high speed rotation in the tire 2. Thus, the tire 2 inhibits reduction of steering stability due to the radial growth. The tire 2 is suitable to high speed running.

At the early stage of cornering at which high speed straight running shifts to cornering, a high braking force acts on the two-wheeled automotive vehicle. Due to the high braking force, a front tire is under a heavy load, and the tire 2 mounted to the rear wheel is under a relatively light load. Meanwhile, at the later stage of the cornering at which high speed cornering shifts to straight running, the two-wheeled automotive vehicle is rapidly accelerated. By the rapid acceleration, the tire 2 is under a heavy load.

In the tire 2, in the straight running, the center region 22 mainly contacts with the ground. In the cornering, the shoulder region 24 mainly contacts with the ground. For the center region 22 and the shoulder region 24, respective crosslinked rubbers suitable to loads that act at the early stage and the later stage of the cornering described above, can be used. The tire 2 can exhibit high running performance in high speed cornering.

The belt cord of the belt 12 extends so as to intersect the equator plane. The belt 12 contributes to improvement of stiffness of the tire 2. The belt 12 allows stiffness of the tread 4 to be improved in the direction in which the belt cord extends. The belt 12 allows the ground contact width of the tread surface 20 to be reduced in the direction orthogonal to the circumferential direction when rapid acceleration occurs at the later stage of the cornering.

In the tire 2 having the curvature radius R that is small, the circumferential length of the tread surface 20 is great on the side closer to the equator plane and is small on the side closer to the tread end Pe. In the tire 2, since the ground contact width of the tread surface 20 is small in the direction orthogonal to the circumferential direction, slipping due to difference in the circumferential length is inhibited over the ground contact width. In the tread surface 20, occurrence of abrasion is inhibited.

In the tire 2, occurrence of abrasion is inhibited, whereby a crosslinked rubber which has been conventionally difficult to use in the shoulder region 24, can be used. For example, a crosslinked rubber that exhibits high grip force can be used in the shoulder region 24. The tire 2 allows improvement of high speed cornering performance since the tire 2 includes the belt 12.

The tire 2, in which an absolute value of an angle of the belt cord relative to the equator plane is great, allows improvement of stiffness in the axial direction. By the stiffness in the axial direction being improved, the ground contact width of the tread surface 20 can be reduced in the direction orthogonal to the circumferential direction. In this viewpoint, an absolute value of an angle of the belt cord relative to the equator plane is not less than 70° and more preferably not less than 80°. The absolute value of the angle is not greater than 90°.

From the viewpoint of improving stiffness in the direction perpendicular to the circumferential direction, the density Ec of the belt cords in the center portion 34 and the density Es of the belt cords in the side portion 36 are each preferably not less than 20 (belt cords/5 cm), and more preferably not less than 30 (belt cords/5 cm). Meanwhile, the tire 2, having the density Es that is small, has excellent transient characteristics. In this viewpoint, the density Ec and the density Es are each preferably not greater than 55 (belt cords/5 cm) and more preferably not greater than 45 (belt cords/5 cm). In the tire 2, the density Ec is preferably less than the density Es. Thus, in the tire 2, stiffness is improved in the shoulder region 24, and contact performance can be improved in the center region 22. In this viewpoint, a density difference (Es−Ec) between the density Es and the density Ec is preferably not less than (belt cords/5 cm), more preferably not less than 3 (belt cords/5 cm), and particularly preferably not less than 5 (belt cords/5 cm). Meanwhile, the tire 2, in which the density difference (Es−Ec) is small, has excellent transient characteristics. In this viewpoint, the density difference (Es−Ec) is preferably not greater than 10 (belt cords/5 cm) and more preferably not greater than 8 (belt cords/5 cm).

In the tire 2 in which the width Wc of the center region 22 is great, the center region 22 easily contacts with the ground in the straight running. Performance of the crosslinked rubber in the center region 22 is exhibited. For example, the center region 22 in which the complex elastic modulus Ec* is low, can sufficiently contact with a road surface also when relatively light load is applied in rapid braking during high speed straight running. Furthermore, the tire 2 having the center region 22 in which the complex elastic modulus Ec* is high, allows rolling resistance to be reduced. Furthermore, in the tire 2, durability is improved. From the viewpoint of sufficiently exhibiting performance of the crosslinked rubber in the center region 22, a ratio (Wc/Wt) of the width Wc of the center region 22 to the tread width Wt is preferably not less than 0.05 and more preferably not less than 0.10.

Meanwhile, in the tire 2 in which the width Wc of the center region 22 is small, the shoulder region 24 easily contacts with the ground in cornering. Performance of the crosslinked rubber in the shoulder region 24 is exhibited. For example, the shoulder region 24, in which the complex elastic modulus Es* is high, can sufficiently exhibit stiffness in a case where a heavy load is applied in rapid acceleration during high speed cornering. Furthermore, the tire 2, having the shoulder region 24 in which the complex elastic modulus Es* is low, can exhibit high grip performance. From the viewpoint of sufficiently exhibiting performance of the crosslinked rubber in the shoulder region 24, a ratio (Wc/Wt) of the width Wc of the center region 22 to the tread width Wt is preferably not greater than 0.20 and more preferably not greater than 0.15.

The belt 12 includes the pair of belt layers 32 spaced from each other over the distance D. The paired belt layers 32 are disposed such that the equator plane is disposed therebetween. In the range over the distance D, the belt 12 does not inhibit contact performance of the tread surface 20. The tire 2 exhibits excellent contact performance at the early stage of the high speed cornering. The tire 2 in which the distance D is great allows the tread surface 20 to exhibit excellent contact performance. Meanwhile, the tire 2, in which the distance D is small, exhibits excellent transient characteristics in shifting between the straight running and the cornering. From the viewpoint of the transient characteristics, the distance D is preferably less than the width We of the center region 22.

In the tire 2, the density Ec of the belt cords in the center portion 34 is less than the density Es of the belt cords in the side portion 40. Thus, the tire 2 exhibits more excellent transient characteristics. Meanwhile, even when the distance D is small, reduction of contact performance of the tread surface 20 is inhibited.

In the tire 2, the complex elastic modulus Ec* in the center region 22 is less than the complex elastic modulus Es* in the shoulder region 24. Thus, the tire 2 exhibits excellent contact performance at the early stage of high speed cornering. Meanwhile, the complex elastic modulus Es* in the shoulder region 24 is higher than the complex elastic modulus Ec* in the center region 22. Thus, the tire 2 exhibits high traction performance at the later stage of high speed cornering.

In the tire 2 having the center region 22 in which the complex elastic modulus Ec* is low, contact performance is excellent in the center region 22. In this viewpoint, the complex elastic modulus Ec* is preferably not higher than 4.0 MPa. Meanwhile, the tire 2, in which the complex elastic modulus Ec* is high, provides excellent steering stability. In this viewpoint, the complex elastic modulus Ec* is preferably not less than 1.0 MPa.

The tire 2, having the shoulder region 24 in which the complex elastic modulus Es* is low, exhibits excellent grip performance. In this viewpoint, the complex elastic modulus Es* is preferably not higher than 4.0 MPa. Meanwhile, the tire 2, in which the complex elastic modulus Es* is high, provides excellent steering stability in cornering. In this viewpoint, the complex elastic modulus Es* is preferably not less than 1.0 MPa.

In the tire 2, the complex elastic modulus Ec* is preferably less than the complex elastic modulus Es*. Thus, the tire 2 allows stiffness to be improved in the shoulder region 24, and allows contact performance in the center region 22 to be improved. In this viewpoint, a difference (Es*−Ec*) between the complex elastic modulus Es* and the complex elastic modulus Ec* is preferably not less than 0.5 MPa and more preferably not less than 0.8 MPa. Meanwhile, the tire 2, in which the difference (Es*−Ec*) is small, exhibits excellent transient characteristics. In this viewpoint, the difference (Es*−Ec*) is preferably not greater than 1.5 MPa and more preferably not greater than 1.2 MPa.

In the present invention, the complex elastic modulus Es* and the complex elastic modulus Ec* are measured by using the viscoelasticity spectrometer (trade name "VESF-3" manufactured by Iwamoto Seisakusho) under the following measurement conditions in compliance with the standard of "JIS K 6394". In this measurement, a plate-shaped test piece (length=45 mm, width=4 mm, thickness=2 mm) is formed from each of the rubber compositions of the center region 22 and the shoulder region 24. This test piece is used for the measurement.

Initial strain: 10%
Amplitude: ±2.5%
Frequency: 10 Hz
Deformation mode: tension
Measurement temperature: 100° C.

The tread 4 of the tire 2 is divided into three portions that are the center region 22 and the pair of shoulder regions 24. However, the present invention is not limited thereto. When crosslinked rubbers suitable to divided portions, respectively, of the tread 4 are used, the tread 4 may be divided into three or more portions. For example, the tread 4 may be divided into five portions, seven portions, or nine portions.

In the present invention, the dimensions and angles of the components of the tire 2 are measured in a state where the tire 2 is mounted on a normal rim, and the tire 2 is inflated with air to a normal internal pressure. During the measurement, no load is applied to the tire 2. In the description herein, the normal rim represents a rim which is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Hereinafter, effects of the present invention will become apparent according to examples. However, the present invention should not be restrictively construed based on the description of examples.

Example 1

A tire shown in The FIGURE was produced. The size of the tire was 200/60R17. An angle of a belt cord relative to the equator plane, a position of the belt, a ratio (Wc/Wt), a ratio (D/Wt), and the number of divided portions of a tread were as indicated below in Table 1. "Outside" in position of belt indicates that the belt was layered outward of a band in the radial direction. "Inside" in position of belt indicates that the belt was layered inward of a band in the radial direction.

Comparative Example 1

A conventional tire was prepared. The tire had no belt. The other components were the same as in example 1.

Comparative Example 2

A tire of comparative example 2 was obtained in the same manner as in example 1 except that a belt was layered inward of a band in the radial direction.

Comparative Example 3

A tire of comparative example 3 was obtained such that a center region and a shoulder region of a tread were formed from the same crosslinked rubber, and a ratio (D/Wt) was as indicated in Table 1. The other components were the same as in example 1.

Examples 2 to 5

Tires of examples 2 to 5 were each obtained in the same manner as in example 1 except that a ratio (Wc/Wt) and a ratio (D/Wt) were as indicated below in Table 2.

[Sensory Evaluation]

A two-wheeled automotive vehicle (four-cycle), for racing, having an engine displacement of 1000 cc, was prepared. Each tire was mounted to a rear wheel of the two-wheeled automotive vehicle. The tire was inflated with air to a tire internal pressure of 180 kPa. A commercially available tire (size=120/70ZR17) was mounted to a front wheel, and was inflated with air to an internal pressure of 240 kPa. The two-wheeled automotive vehicle was caused to run on a circuit course having an asphalt road surface. Sensory evaluation was made, by a rider, for slide control performance, braking performance, contact performance, and transient characteristics. The results are indicated below in Tables 1 and 2 as indexes with the value of comparative example 1 being 5. The greater the value of the index is, the better the evaluation is.

[Evaluation of Abrasion]

Outer appearance of the shoulder region of the tire having been subjected to running on the circuit course, was visually checked. The shoulder region was checked for presence or absence of abrasion. The results are indicated below in Tables 1 and 2 as indexes with the value of comparative example 1 being 5. The greater the value of the index is, the better the evaluation is.

TABLE 1

| | Evaluation result | | | |
|---|---|---|---|---|
| | Comp. Ex. 1 | Ex. 1 | Comp. Ex. 2 | Comp. Ex. 3 |
| Angle (°) of belt cord | — | 90 | 90 | 90 |
| Position of belt | — | Outside | Inside | Outside |
| Wc/Wt | 0.1 | 0.1 | 0.1 | 0.1 |
| D/Wt | — | 0.07 | 0.07 | 0.2 |
| Number of divided portions of tread | 3 | 3 | 3 | 1 |
| Slide control | 5 | 8 | 5 | 8 |
| Braking performance | 5 | 8 | 7 | 3 |
| Contact performance | 5 | 8 | 5 | 3 |
| Abrasion | 5 | 8 | 7 | 8 |
| Transient characteristic | 5 | 8 | 8 | 10 |
| Overall evaluation | 25 | 40 | 32 | 32 |

TABLE 2

| | Evaluation result | | | |
|---|---|---|---|---|
| | Ex. 2 | Ex. 3 | Ex. 4 | Ex. 5 |
| Angle (°) of belt cord | 90 | 90 | 90 | 90 |
| Position of belt | Outside | Outside | Outside | Outside |
| Wc/Wt | 0.2 | 0.2 | 0.3 | 0.1 |
| D/Wt | 0.07 | 0.15 | 0.07 | 0.2 |
| Number of divided portions of tread | 3 | 3 | 3 | 3 |
| Slide control | 8 | 8 | 5 | 8 |
| Braking performance | 10 | 10 | 10 | 8 |
| Contact performance | 8 | 8 | 10 | 8 |
| Abrasion | 8 | 8 | 5 | 8 |
| Transient characteristic | 5 | 3 | 2 | 2 |
| Overall evaluation | 39 | 37 | 32 | 34 |

As indicated in Tables 1 and 2, evaluation is higher in the tires of examples than in the tires of comparative examples. The evaluation result clearly indicates that the present invention is superior.

The above-described method can be widely applied to tires for two-wheeled automotive vehicles.

The foregoing description is in all aspects illustrative, and various modifications can be devised without departing from the essential features of the invention.

What is claimed is:

1. A tire for a two-wheeled automotive vehicle, the tire comprising:

a tread forming a tread surface;

a band disposed inward of the tread in a radial direction; and a belt disposed between the tread and the band in the radial direction, wherein the tread includes a center region disposed at a center in an axial direction, and a shoulder region disposed on an outer side in the axial direction, wherein a ratio (Wc/Wt) of a width Wc of the center region to a width Wt of the tread is not less than 0.05 and not greater than 0.20, and a complex elastic modulus Ec* of the center region is less than a complex elastic modulus Es* of the shoulder region, the band includes a band cord, and the band cord is helically wound and extends in a circumferential direction, the belt includes first and second belt layers spaced from each other over a distance D in the axial direction, the first belt layer is disposed on a first lateral side of the equator plane in the axial direction, the second belt layer is disposed on a second lateral side of the equator plane in the axial direction, the distance D is less than the width Wc of the center region, each of the first and second belt layers includes belt cords, the belt cords extend so as to be tilted relative to an equator plane, an absolute value of an angle of the belt cords relative to the equator plane is not less than 70° and not greater than 90°, and the belt cords of the first and second belt layers have a belt cord number density Ec in the center region that is less than the belt cord number density Es in the shoulder region.

2. The tire according to claim 1, wherein a density difference (Es−Ec) between the belt cord number density Ec and the belt cord number density Es is not less than 2 (belt cords/5 cm) and not greater than 10 (belt cords/5 cm).

3. The tire according to claim 1, wherein a difference (Es*−Ec*) between the complex elastic modulus Ec* and the complex elastic modulus Es* is not less than 0.5 MPa and not greater than 1.5 MPa.

4. The tire according to claim 1, wherein the ratio Wc/Wt is not less than 0.05 and not greater than 0.10.

5. The tire according to claim 1, wherein a boundary between the center region and the shoulder region extends from a radially inner side toward a radially outer side so as to be tilted from an axially outer side toward an axially inner side.

6. The tire according to claim 1, wherein the tread center region and tread shoulder region are formed from different crosslinked rubbers.

* * * * *